US007112941B2

(12) United States Patent
Chrostowski

(10) Patent No.: US 7,112,941 B2
(45) Date of Patent: Sep. 26, 2006

(54) SYSTEM AND METHOD FOR ESTIMATING MOTOR TEMPERATURE FOR MOTOR OVERUSE PROTECTION

(75) Inventor: Thomas Chrostowski, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/955,127

(22) Filed: Sep. 30, 2004

(65) Prior Publication Data

US 2006/0066277 A1 Mar. 30, 2006

(51) Int. Cl.
*H02P 5/34* (2006.01)

(52) U.S. Cl. ........................ 318/801; 318/432; 318/799

(58) Field of Classification Search ................ 318/801, 318/432, 799, 431, 254, 439, 138, 471, 481; 388/934, 802, 806
See application file for complete search history.

(56) References Cited

U.S. PATENT DOCUMENTS 4,743,818 A 5/1988 Quayle et al.
4,914,386 A 4/1990 Zocholl
5,446,362 A * 8/1995 Vanek et al. ................ 318/801
5,525,881 A 6/1996 Desrus
5,675,497 A 10/1997 Petsche et al.
5,760,556 A 6/1998 Hamilton, Jr. et al.
5,814,955 A * 9/1998 Bauer et al. ................ 318/376
6,334,503 B1 * 1/2002 Fukumura et al. .......... 180/446
2003/0111976 A1 6/2003 Kumar
2003/0179486 A1 * 9/2003 Ho et al. ...................... 360/71

FOREIGN PATENT DOCUMENTS

JP 59103593 A 6/1994

OTHER PUBLICATIONS

Combined Search and Examination Report under Sections 17 and 18(3) dated Feb. 15, 2006, 6 pages.

* cited by examiner

*Primary Examiner*—Karen Masih
(74) *Attorney, Agent, or Firm*—Brooks Kushman P.C.

(57) ABSTRACT

To protect against overuse of a motor, such as may be used to control seat position in an automotive vehicle, an estimated temperature of the motor is determined based on an ambient temperature, a current applied to the motor, a period of time during which the current is applied to the motor, and at least one thermal property. A voltage applied to the motor is reduced, such as by a motor controller, when the estimated motor temperature is greater than a safe operating temperature of the motor.

19 Claims, 1 Drawing Sheet

SYSTEM AND METHOD FOR ESTIMATING MOTOR TEMPERATURE FOR MOTOR OVERUSE PROTECTION

BACKGROUND OF THE INVENTION

1. Field of the Invention

The following relates to a system and method for protecting a motor against overuse based on an estimated motor temperature.

2. Background Art

It is increasingly common in automotive vehicles to use electric motors for positioning a wide variety of vehicle components, including specifically both driver and passenger seats. Controllers are typically provided for controlling such motors based on input from a vehicle seat occupant. In that regard, the vehicle seat occupant provides such input by manipulating switches to direct the vehicle seat position. Such switches can include memory position switches, which position the vehicle seat based on position information previously stored in a memory.

Present motors used in automotive vehicles for positioning vehicle seats use a Positive Temperature Coefficient (PTC) device that when heated increases its resistance, thereby protecting the motor against the thermal effects of overuse. However, such a PTC device adds to the cost of the motor assembly.

As a result, there exists a need for a system and method that would eliminate such a PTC device, thereby reducing the cost of the motor assembly. Such a system and method would estimate the motor temperature, based on factors such as ambient temperature, current, time and thermal properties, thereby eliminating the need for thermal protection PTC devices and resulting in a cost savings.

SUMMARY OF THE INVENTION

Accordingly, a system, device and method are provided for protecting a motor against overuse using an estimated motor temperature.

According to one embodiment, a system for protecting a motor against overuse is provided. The system comprises a controller for controlling a voltage applied to the motor, and means for determining an estimated temperature of the motor based on an ambient temperature, a current applied to the motor, a period of time during which the current is applied to the motor, and at least one thermal property. The means for determining an estimated motor temperature provides a signal for use by the motor controller to reduce the voltage applied to the motor when the estimated motor temperature is greater than a safe operating temperature of the motor.

According to another embodiment, a method for protecting a motor against overuse is provided. The method comprises determining an estimated temperature of the motor based on an ambient temperature, a current applied to the motor, a period of time during which the current is applied to the motor, and at least one thermal property. The estimated motor temperature is for use in reducing a voltage applied to the motor when the estimated motor temperature is greater than a safe operating temperature of the motor.

According to another embodiment, a device for protecting a motor against overuse is provided. The device comprises an estimator for determining an estimated temperature of the motor based on an ambient temperature, a current applied to the motor, a period of time during which the current is applied to the motor, and at least one thermal property. The estimator provides a signal for use in reducing the voltage applied to the motor when the estimated motor temperature is greater than a safe operating temperature of the motor.

A detailed description and accompanying drawings are set forth below.

DETAILED DESCRIPTION OF THE PREFERRED EMBODIMENTS

Figure 1:
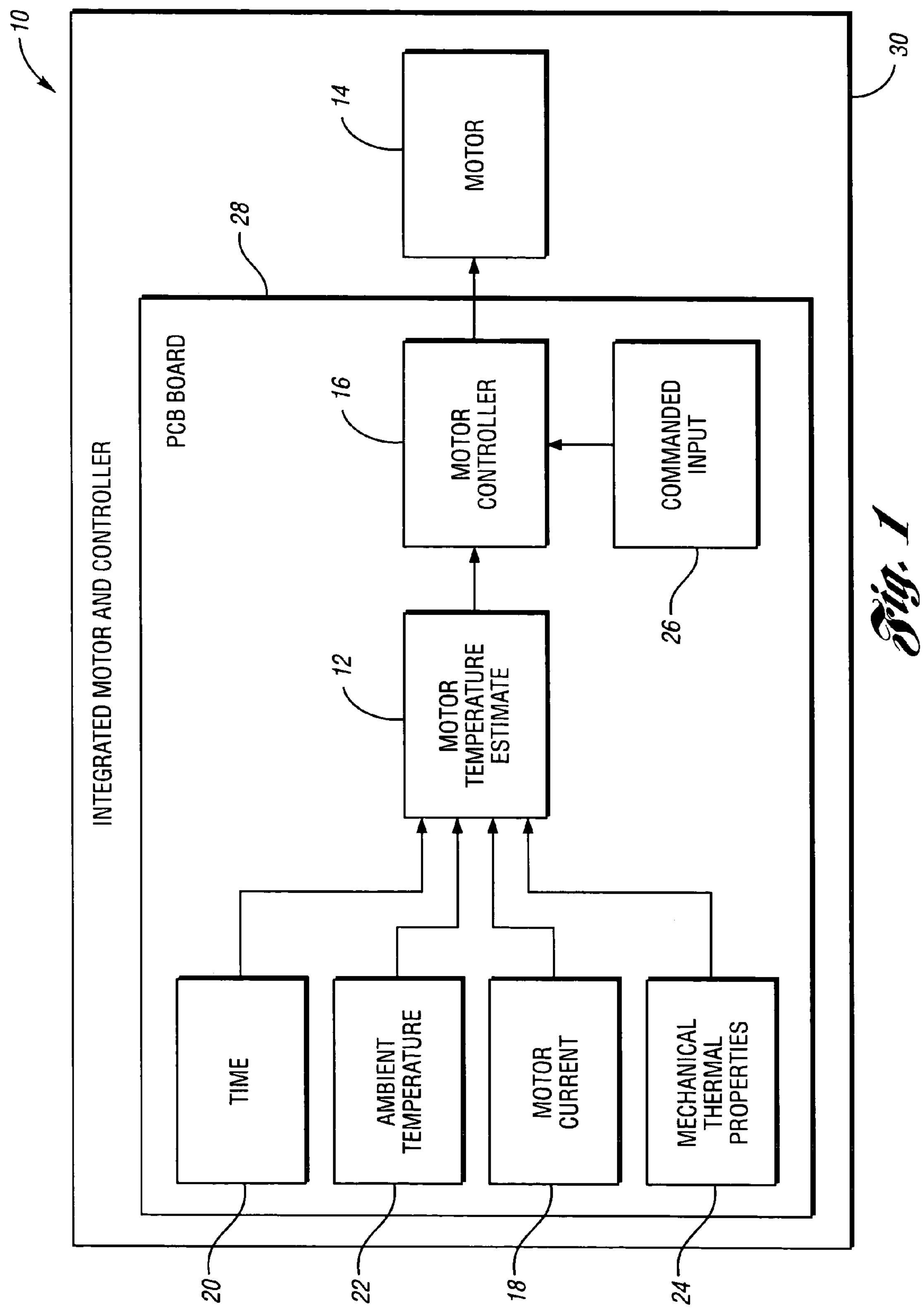
FIG. 1 is a block diagram depicting the system, method and device described herein.

With reference to the Figure, a more detailed description of the system, method and device will now be provided. As previously indicated, it is increasingly common in automotive vehicles to use electric motors for positioning a wide variety of vehicle components, including specifically both driver and passenger seats.

Such electric motors are typically controlled by motor controllers based on input from a vehicle seat occupant. The vehicle seat occupant provides such input by manipulating switches to direct the vehicle seat position. Such switches can include memory position switches, which position the vehicle seat based on position information previously stored in a memory.

As also previously indicated, present motors used in automotive vehicles for positioning vehicle seats use a Positive Temperature Coefficient (PTC) device that when heated increases its resistance, thereby protecting the motor against the thermal effects of overuse. However, such a PTC device adds to the cost of the motor assembly.

As a result, there exists a need for a system and method that would eliminate such a PTC device, thereby reducing the cost of the motor assembly. Such a system and method would estimate the motor temperature, based on factors such as ambient temperature, current, time and thermal properties, thereby eliminating the need for thermal protection PTC devices and resulting in a cost savings.

Referring now more specifically to the Figure, a block diagram of the system, method and device described herein is shown, denoted generally by reference numeral 10. In general terms, the temperature of a vehicle seat motor is estimated, and this estimate is used to reduce or increase the voltage, such as the average voltage, applied to the seat motor. That is, when the estimated motor temperature is greater than a safe operating temperature of the motor, a motor controller or a control unit for the motor reduces the voltage applied to the motor, thereby protecting the motor.

In that same regard, when the motor temperature is estimated to be in the safe operating range for the motor, the voltage applied to the motor can be increased. In such a fashion, thermal protection mechanisms for the motor, such as PTC's, can be removed, thereby resulting in a cost savings.

More specifically, an algorithm may be employed that uses the ambient temperature of the motor, motor current, time, and mechanical thermal properties or characteristics of the system to estimate the temperature of the seat motor. As will be appreciated by those skilled in the art, such an algorithm may take any form, provided factors described above are employed in estimating motor temperature. The motor and the motor controller or control unit may be integrated so that inputs to the motor are not accessible to the customer. In such a fashion, failure modes involving the motor wires are not credible.

As seen in the Figure, an estimate (12) of a temperature of a motor (14) is provided to controller or control unit (16) for the motor (14). As also seen therein, the estimate (12) of the motor temperature may be based on a number of factors or inputs, which may themselves be values or characteristics that are measured, estimated or empirically determined in any fashion well known in the art.

In that regard, the estimate (12) of the motor temperature may be based on a current (18) applied to the motor (14), which may be the average current, as well as a period of time (20) that such a current (18) is applied to the motor (14). The estimate (12) of the motor temperature may also be based on an ambient temperature (22), as well as mechanical thermal characteristics (24) of the system as a whole, or any device, devices, part, parts, sub-part or sub-parts thereof, such as the motor (14). As also seen in the Figure, the motor (14) may receive commanded input (26), such as input from a vehicle seat occupant for a particular seat position. As previously indicated, such commanded input (26) may be provided by the seat occupant by manipulating switches to direct the vehicle seat position. As also previously indicated, such switches can include memory position switches, which position the vehicle seat based on position information previously stored in a memory.

The estimated motor temperature (12), which may take the form of a signal representative thereof, is provided to the motor controller (16) for use in controlling the motor (14). In that regard, a voltage applied to the motor (14), such as the average voltage, may be reduced by the motor controller (16) when the estimated motor temperature (12) exceeds that of a safe operating temperature or a recommended safe operating temperature range for the motor (14).

Similarly, the motor controller (16) may then increase the voltage applied to the motor (14), which again may be the average voltage, when the estimated motor temperature (12) no longer exceeds that of a safe operating temperature or returns to a recommended safe operating temperature range for the motor (14). It should be noted that such a safe operating temperature or recommended safe operating temperature range for the motor (14) may be established by the motor manufacturer or by others in any fashion well known in the art.

Referring still to the Figure, a system for protecting the motor (14) against overuse is shown. As seen therein, the system comprises a controller or control unit (16) for controlling a voltage applied to the motor (14). The system also comprises means for determining an estimated temperature (12) of the motor based on an ambient temperature (22), a current (18) applied to the motor (14), a period of time (20) during which the current (18) is applied to the motor (14), and at least one thermal property (24).

Once again, as seen in the Figure, the motor (14) may receive commanded input (26). As previously indicated, such commanded input (26) may be provided by a vehicle seat occupant by manipulating switches to direct the vehicle seat position. Such switches can include memory position switches, which position the vehicle seat based on position information previously stored in a memory.

The determining means (12) provides a signal for use by the motor controller (16) to reduce the voltage applied to the motor (14) when the estimated motor temperature is greater than a safe operating temperature of the motor (14). In that regard, the means for determining an estimated temperature (12) of the motor (14) may comprise an algorithm, an appropriately programmed microprocessor, or any equivalents thereof. As previously described, such an algorithm, microprocessor, or any equivalents thereof may take any form, provided factors described above are employed in estimating motor temperature.

It should be noted that the controller (16) and the means (12) for estimating the temperature of the motor (14) may be integrated, such as by being mounted or fabricated on a printed circuit board (28) or any other type of circuit board or plate. It should still further be noted that the motor (14) and the controller (16) may be integrated (30) which, as shown in the Figure, may include a configuration where the controller (16) and the means for estimating (12) the temperature of the motor (14) are integrated (28).

The Figure also shows a method for protecting the motor (14) against overuse. More specifically, the method comprises determining an estimated temperature (12) of the motor (14) based on an ambient temperature (22), a current (18) applied to the motor (14), a period of time (20) during which the current (18) is applied to the motor (14), and at least one thermal property (24). The estimated motor temperature is for use in reducing a voltage applied to the motor (14) when the estimated motor temperature is greater than a safe operating temperature of the motor (14).

As previously described, the estimated motor temperature (12) may also be used for increasing the voltage applied to the motor (14) when the estimated motor temperature (12) returns to a level no greater than the safe operating temperature of the motor (14). As also previously described, the ambient temperature (22) may be a measured temperature, the motor current (18) may be a measured current, and the current (18) may be zero for any period of time (20). In addition, the at least one thermal property (24) may be at least one thermal property of the motor (14).

Here again, the motor (14) may receive commanded input (26). As previously indicated, such commanded input (26) may be provided by a vehicle seat occupant by manipulating switches to direct the vehicle seat position. Such switches can include memory position switches, which position the vehicle seat based on position information previously stored in a memory.

As previously discussed, the controller or control unit (16) and the estimate (12) of the temperature motor (14) may be integrated, such as by being mounted or fabricated on a printed circuit board (28) or any other type of circuit board or plate. The motor (14) and the controller (16) may also be integrated (30) which, as shown in the Figure, may include a configuration where the controller (16) and the estimate (12) of the temperature of the motor (14) are integrated (28).

Still further, the Figure also shows a device for protecting the motor (14) against overuse. As seen therein, the device comprises an estimator (12) for determining an estimated temperature of the motor based on an ambient temperature (22), a current (18) applied to the motor (14), a period of time (20) during which the current (18) is applied to the motor (14), and at least one thermal property (24).

The estimator (12) provides a signal for use by the motor controller or control unit (16) to reduce the voltage applied to the motor (14) when the estimated motor temperature is greater than a safe operating temperature of the motor (14). The estimator (12) may also provide a signal for use by the motor controller (16) to increase the voltage applied to the motor (14) when the estimated motor temperature returns to a level no greater than the safe operating temperature of the motor (14).

As previously described, the ambient temperature (22) may be a measured temperature, the motor current (18) may be a measured current, and the current (18) may be zero for any period of time (20). In addition, the at least one thermal property (24) may be at least one thermal property of the motor (14). Alternatively, the at least one thermal property (24) may be at least one thermal property of the motor (14) and the controller (16).

Once again, as seen in the Figure, the motor (14) may receive commanded input (26). As previously indicated, such commanded input (26) may be provided by a vehicle seat occupant by manipulating switches to direct the vehicle seat position. Such switches can include memory position switches, which position the vehicle seat based on position information previously stored in a memory.

Still further, the estimator (12) may be an algorithm, an appropriately programmed microprocessor, or any type of device or program capable of determining an estimated temperature of the motor (14). As previously described, such an algorithm, microprocessor, or other device or program may take any form, provided factors described above are employed in estimating motor temperature. It should also be noted that the controller (16) and the estimator (12) for estimating the temperature of the motor (14) may be integrated, such as by being mounted or fabricated on a printed circuit board (28) or any other type of circuit board or plate. It should further be noted that the motor (14) and the controller (16) may also be integrated (30) which, as shown in the Figure, may include a configuration where the controller (16) and the estimator (12) for estimating the temperature of the motor (14) are integrated (28).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for protecting a motor against overuse, the system comprising:

a controller for controlling a voltage applied to the motor; and means for determining an estimated temperature of the motor based on an ambient temperature, a current applied to the motor, a period of time during which the current is applied to the motor, and at least one thermal property, wherein the determining means provides a signal for use by the motor controller to reduce the voltage applied to the motor when the estimated motor temperature is greater than a safe operating temperature of the motor and provides a signal for use by the motor controller to increase the voltage applied to the motor when the estimated motor temperature returns to a level no greater than the safe operating temperature of the motor.

2. The system of claim 1 wherein the means for determining an estimated temperature of the motor comprises a microprocessor.

3. The system of claim 1 wherein the means for determining an estimated temperature of the motor comprises an algorithm.

4. A method for protecting a motor against overuse, the method comprising:

determining an estimated temperature of the motor based on an ambient temperature, a current applied to the motor, a period of time during which the current is applied to the motor, and at least one thermal property, the estimated motor temperature for use in reducing a voltage applied to the motor when the estimated motor temperature is greater than a safe operating temperature of the motor and for use in increasing the voltage applied to the motor when the estimated motor temperature returns to a level no greater than the safe operating temperature of the motor.

5. The method of claim 4 wherein the estimated motor temperature is for use in increasing the voltage applied to the motor when the estimated motor temperature returns to a level no greater than the safe operating temperature of the motor.

6. The method of claim 4 wherein the ambient temperature comprises a measured temperature.

7. The method of claim 4 wherein the motor current comprises a measured current.

8. The method of claim 4 wherein the motor current is zero.

9. The method of claim 4 wherein the at least one thermal property comprise at least one thermal property of the motor.

10. A device for protecting a motor against overuse, the device comprising:

an estimator for determining an estimated temperature of the motor based on an ambient temperature, a current applied to the motor, a period of time during which the current is applied to the motor, and at least one thermal property, wherein the estimator provides a signal for use in reducing the voltage applied to the motor when the estimated motor temperature is greater than a safe operating temperature of the motor; and wherein the estimator provides a signal for use in increasing the voltage applied to the motor when the estimated motor temperature returns to a level no greater than the safe operating temperature of the motor.

11. The device of claim 10 wherein the ambient temperature comprises a measured temperature.

12. The device of claim 10 wherein the motor current comprises a measured current.

13. The device of claim 10 wherein the motor current is zero.

14. The device of claim 10 wherein the at least one thermal property comprise at least one thermal property of the motor.

15. The device of claim 10 wherein the at least one thermal property comprises at least one thermal property of the motor and a motor controller.

16. The device of claim 10 wherein the estimator comprises a microprocessor.

17. The device of claim 10 wherein the estimator comprises an algorithm.

18. The device of claim 10 wherein the estimator and a motor controller are integrated.

19. The device of claim 10 wherein the motor and a motor controller are integrated.

* * * * *